C. D. NEELY.
ANIMAL TRAP.
APPLICATION FILED SEPT. 5, 1917.
1,261,273.
Patented Apr. 2, 1918.
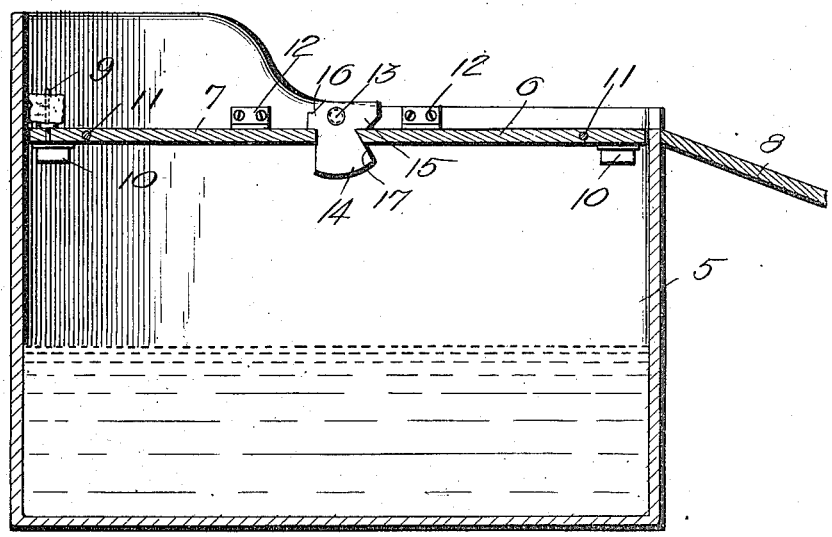
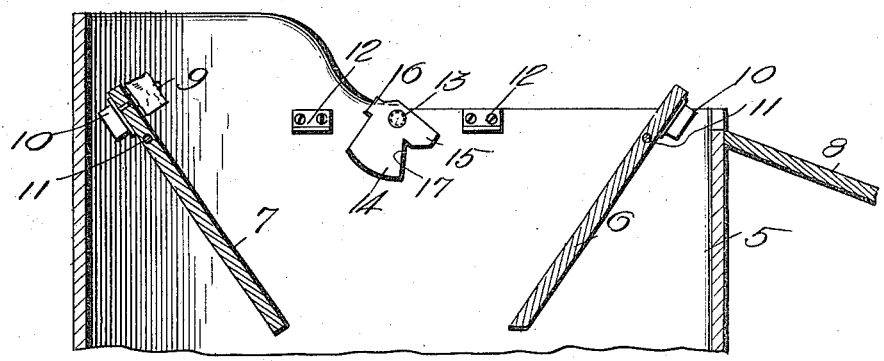
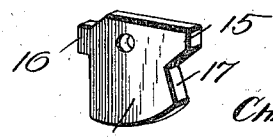
INVENTOR
CHARLES D. NEELY.
BY
ATTORNEYS

UNITED STATES PATENT OFFICE.

CHARLES D. NEELY, OF CHICAGO, ILLINOIS.

ANIMAL-TRAP.

1,261,273.  Specification of Letters Patent.  Patented Apr. 2, 1918.

Application filed September 5, 1917. Serial No. 189,766.

*To all whom it may concern:*

Be it known that I, CHARLES D. NEELY, a citizen of the United States, residing at Chicago, in the county of Cook and State of Illinois, have invented new and useful Improvements in Animal-Traps, of which the following is a specification.

This invention relates to animal traps in which the animal is precipitated into an inclosure when it steps on a tiltable platform associated therewith. In the present instance two platforms are provided which are held by a latch device of novel construction. The bait or lure is located at the end of one platform, and when the animal steps thereon, both platforms tilt to precipitate the animal into the inclosure, after which the platforms swing back to their normal position and the trap is set for the next victim.

In order that the invention may be better understood, reference is had to the accompanying drawing forming a part of this specification, and in said drawing—

Figure 1 is a cross section of the trap showing the same set;

Fig. 2 is a similar view showing the platforms freed and tilted, and

Fig. 3 is a perspective view of a latch device.

Referring specifically to the drawing 5 denotes a suitable container which is constructed to hold water so that the animals which drop thereinto are drowned. The top of the container is closed by two tiltable platforms 6 and 7 respectively which are reached by a runway 8 leading thereto. These two platforms are normally flush and in horizontal position, and in this position they form a closure for the container. One platform is at the front of the container, and the other at the rear. The runway 8 leads to the front platform which is denoted by the reference character 6. At the remote end of the rear platform 7 is a holder 9 for the bait, and hence in order to reach the bait, the animal must pass over the platforms 6 and 7 in the order named. The side and rear walls of the container are continued above the rear platform 7 a sufficient distance to serve as a barrier and prevent the animal from escaping at the rear or sides of the platform. Each platform is weighted at one end as shown at 10 so that they may automatically return to closing position. The pivots 11 of the two platforms are remote from the meeting ends thereof, and the tilting movement is at these ends. The upward movement of the platforms is limited by suitable stops 12 mounted on the side walls of the container.

To one of the side walls of the container, on the inside thereof, is pivoted, as shown at 13, a pendent latch dog comprising a body 14 having on opposite sides of its pivot laterally projecting lugs 15 and 16 respectively. The lugs are positioned above the free edges of the platforms, the lugs 15 engaging the front platform 6 and the lug 16 the rear platform 7. The body 14 is heavier on the side from which the lug 15 projects than on the side from which the lug 16 projects. The first mentioned side of the body also has a slanting edge 17, and the free edge of the platform 6 is beveled correspondingly to fit said edge. It will be noted that the lug 16 is much shorter than the lug 15 so that it extends over the platform 7 a relatively short distance.

As the body 14 of the latch dog is positioned between the free ends of the platforms 6 and 7 when the latter are in closing position, they are prevented from tilting, even though a weight is placed on the front platform 6. However when the animal steps on the rear platform 7, the latter tilts as its free edge is not beveled and the adjacent edge of the latch dog is also not beveled. As soon as the rear platform tilts, the dog is freed, and as it is heavier on the side from which the lug 15 projects, it swings or tilts in that direction as shown in Fig. 2 and tilts the platform 6, and the animal is precipitated into the container 5. The front platform 6 is held steady until the animal steps on the rear platform 7, so that the animal is not alarmed by an insecure foothold. After the platforms have tilted they automatically swing back to horizontal position and the latch device again swings into engagement therewith to hold the same. The front platform 6, when it swings upward, strikes the lug 15 and tilts the dog back to the position shown in Fig 1, whereupon the lug 15 comes into the path of the platform 7 to intercept and hold the same. The trap is now reset and ready for the next victim.

I claim:—

An animal trap comprising a container, a closure at the top of the container, said closure comprising a pair of tiltable platforms having their free ends in juxtaposition, and a pivoted latch dog for holding the platform stationary, said dog comprising a pendent body portion seating between the free ends of the platform, and having outstanding lugs on opposite sides of its pivot and engageable respectively with the platforms, the side of the latch body which is engaged by one of the platforms being slanting and the edge of said platform being correspondingly beveled, and said latch body being heavier on the side from which the last mentioned lug extends than on the side from which the other lug extends.

In testimony whereof I affix my signature.

CHARLES D. NEELY.

Copies of this patent may be obtained for five cents each, by addressing the "Commissioner of Patents, Washington, D. C."